Figures 3, 4:
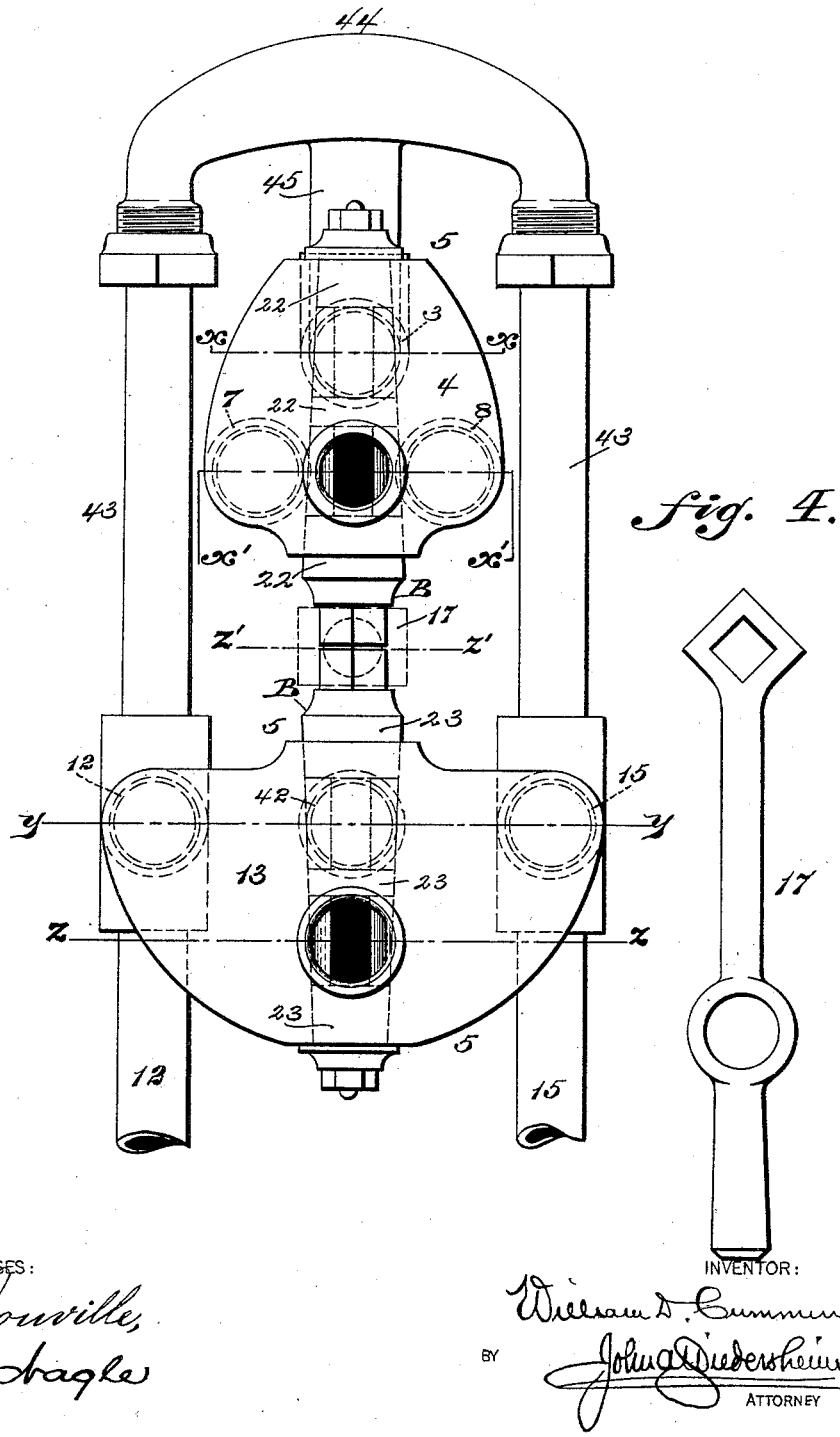

(No Model.) 4 Sheets—Sheet 1.
W. D. CUMMINGS.
FILTER.
No. 424,762. Patented Apr. 1, 1890.
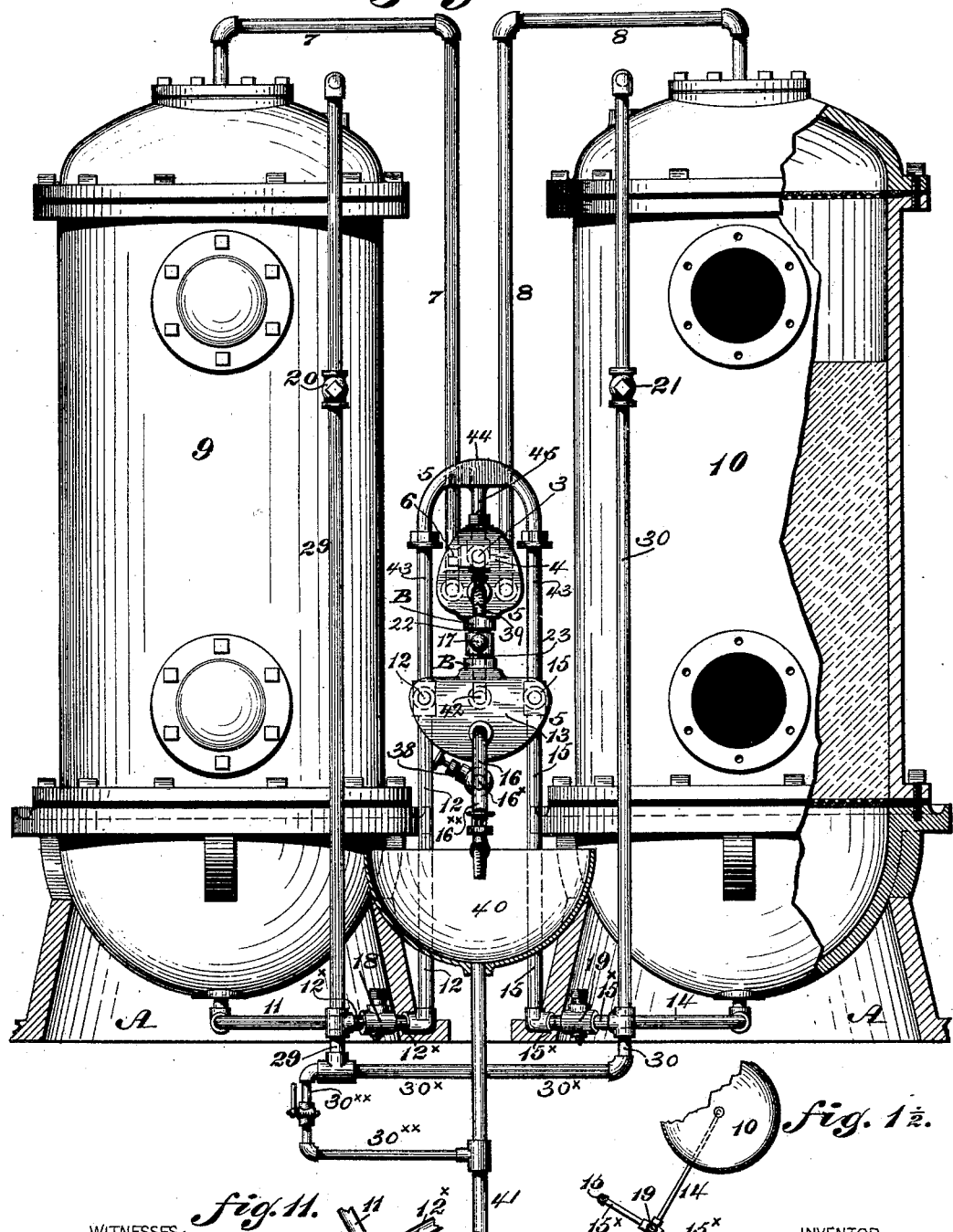
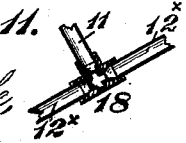
WITNESSES:
L. Douville,
P. F. Eagle
INVENTOR:
William D. Cummings
By John A. Diekerheim
ATTORNEY.

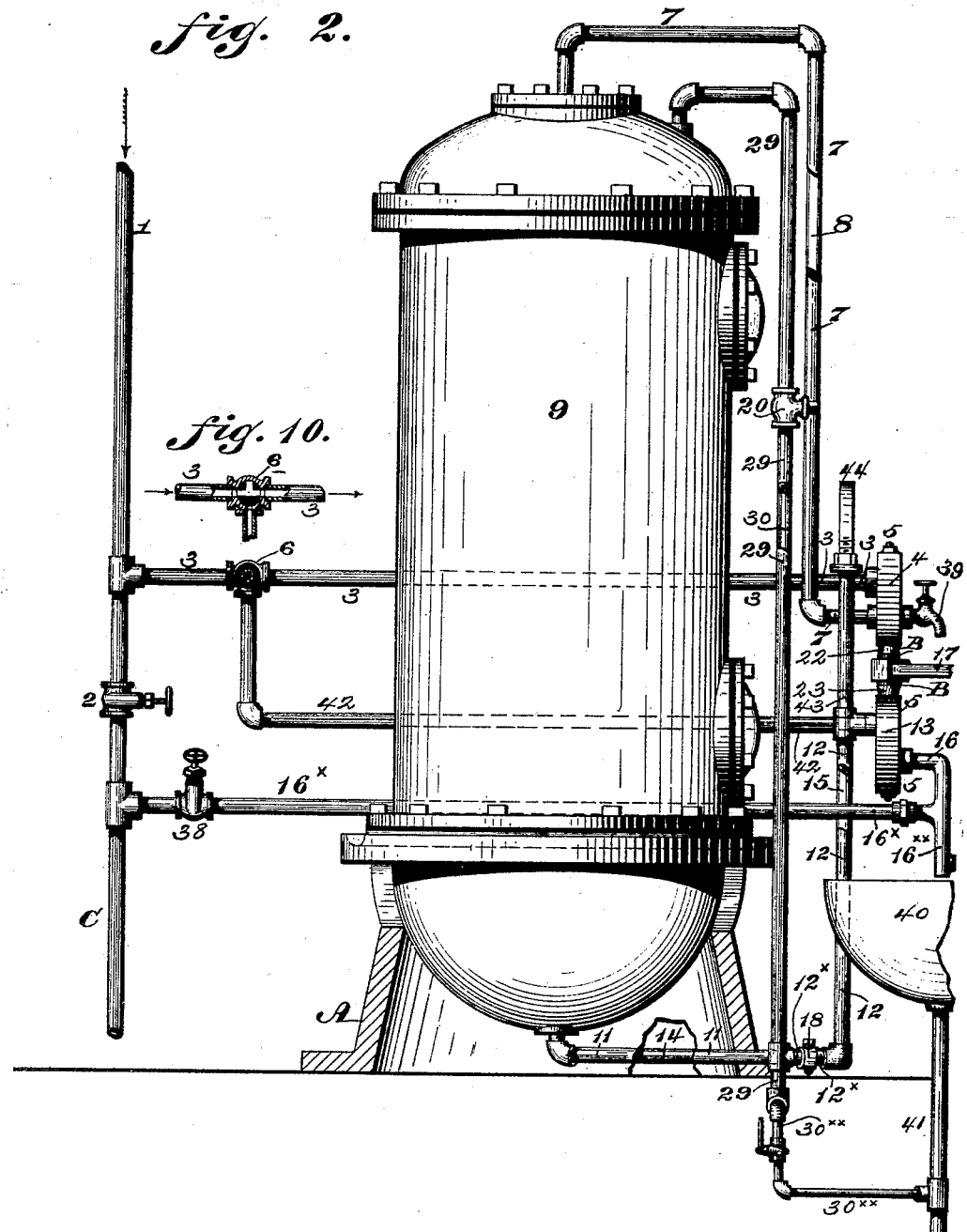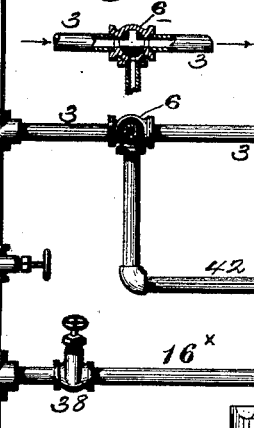

(No Model.) 4 Sheets—Sheet 3.

W. D. CUMMINGS.
FILTER.

No. 424,762. Patented Apr. 1, 1890.

WITNESSES:
L. Douville,
P. H. Nagle

INVENTOR:
William D. Cummings
BY John A. Wiedersheim
ATTORNEY (No Model.) 4 Sheets—Sheet 4.
W. D. CUMMINGS.
FILTER.
No. 424,762. Patented Apr. 1, 1890.
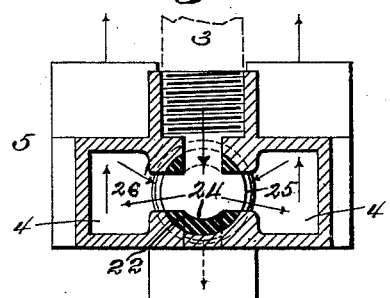
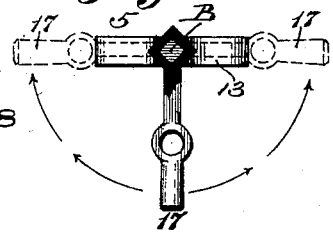
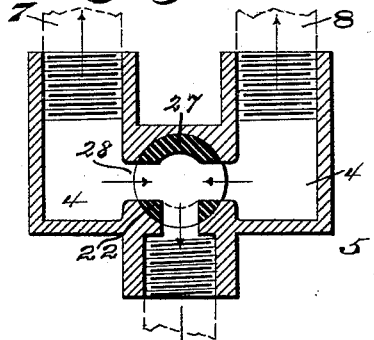
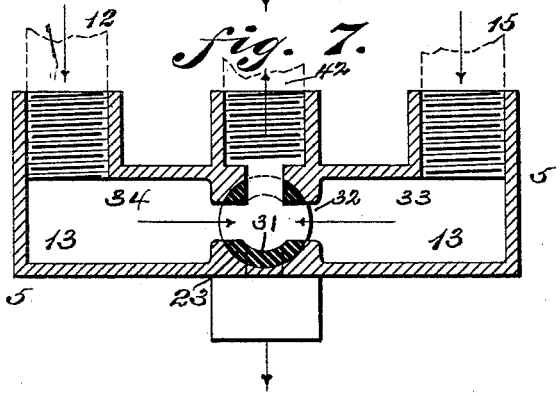
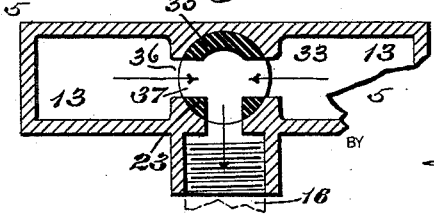

ered with the pipe

UNITED STATES PATENT OFFICE.

WILLIAM D. CUMMINGS, OF ALLEGHENY, PENNSYLVANIA.

FILTER.

SPECIFICATION forming part of Letters Patent No. 424,762, dated April 1, 1890.

Application filed November 8, 1889. Serial No. 329,653. (No model.)

*To all whom it may concern:*

Be it known that I, WILLIAM D. CUMMINGS, a citizen of the United States, formerly residing at Pittsburg, now of Allegheny, in the county of Allegheny, and State of Pennsylvania, have invented a new and useful Improvement in Filters, which improvement is fully set forth in the following specification and accompanying drawings.

My invention consists of a filter having novel features, as follows: Means for effectively filtering water or other fluid, doubly filtering the same, cleansing or washing the filter and freshening the filtering material, and discharging unfiltered fluid, if so desired.

Figure 1 represents a partial front view and partial vertical section of a filter embodying my invention. Fig. $1\frac{1}{2}$ represents a partial top view and partial horizontal section of a detached portion on a reduced scale. Fig. 2 represents a side elevation thereof. Figs. 3 represents a front view of the "manipulator" on an enlarged scale. Fig. 4 represents a face view of a lever employed. Figs. 5, 6, 7, and 8 represent horizontal sections, respectively, on lines $x$ $x$, $x'$ $x'$, $y$ $y$, and $z$ $z$, Fig. 3. Fig. 9 represents a partial top plan view and partial horizontal section on a reduced scale, line $z'$ $z'$, Fig. 3. Fig. 10 represents a sectional view of a portion adjacent to Fig. 2. Fig. 11 represents a section of one of the three-way cocks in the lower part of the filter.

Similar letters and numerals of reference indicate corresponding parts in the several figures.

Referring to the drawings, A designates the bases or stands which support various parts of the filter.

1 designates the supply-pipe, which is provided with a valve 2 and connected with a pipe 3, one end of the latter being connected with the chamber 4 of the upper part of a manipulator 5, said pipe 3 being provided with a cock 6 adjacent to the pipe 1. Connected with the chamber 4 are pipes 7 and 8, which are connected, respectively, with the upper ends of filtering chambers or vessels 9 and 10, the latter being sustained on the stands A. Connected with the bottom of the vessel 9 is a pipe 11, which is attached to the three-way cock 18 of a pipe $12^\times$, one end of the latter having connected with it the pipe 12 and the other end having connected with it the pipe 29, the latter being also connected with the top of the cylinder 9 and provided with a cock 20. Connected with the bottom of the vessel 10 is a pipe 14, which is attached to the three-way cock 19 of a pipe $15^\times$, one end of the latter having connected with it the pipe 15, and the other end having connected with it the pipe 30, the latter being also connected with the top of the cylinder 10 and provided with a cock 21. The upper ends of the pipes 12 and 15 are connected with the lower chamber of the manipulator 5, it being noticed that the manipulator consists of a shell forming two chambers 4 and 13, in which are fitted the ends 22 and 23 of a three-way or compound valve B, which is provided with a lever 17, so as to turn the same to the right or left for placing the ports thereof in different positions. (Shown in Figs. 5 to 8, inclusive.) Connected with the chamber 13 is a pipe 16, which is connected with a branch $16^\times$ and a branch $16^{\times\times}$, said branch $16^\times$ being provided with a cock 38 and attached to a discharge-pipe C. The lower end of the pipe 30, which, as has been stated, is connected with the pipe $15^\times$, is attached to a pipe $30^\times$, which is also connected with the lower end of the pipe 29, and attached by means of a pipe $30^{\times\times}$ to a discharge-pipe 41, said pipe $30^{\times\times}$ and said pipe 41 being in communication with a bowl 40, which is located below a spigot or cock on the discharge-pipe $16^{\times\times}$. The upper chamber 4 of the manipulator 5 is provided with a spigot or cock 39, the same being above the lever 17, the latter having an opening in its handle to allow the drip to fall therethrough.

The operation is as follows: For simple filtration of water (or other fluid) the lever 17 occupies the position shown in full lines, Fig. 9, and the ports of the plug B are in the position shown in Figs. 5, 6, 7, and 8, the arrows indicating the flow of the water. Water from the main enters the pipe 1 and passes into the pipe 3, the valve 2 being closed and the valve 6 opened, as shown in Fig. 10. The water now reaches the chamber 4 and enters the pipes 7 and 8, whereby it is directed into the cylinders 9 and 10. Water in filtered condition leaves the cylinder 9 through the pipe 11, and passing through one end of the pipe $12^\times$ and the pipe 12 reaches the chamber 13 of the manipulator. Water in filtered condition leaves the cylinder 10 through the pipe 14, and, passing through one end of the pipe $15^\times$ and the pipe 15, reaches the chamber 13, the cocks 18 and 19 having been turned to permit the water to enter the respective pipes $12^\times$ and $15^\times$ without entering the pipe $30^\times$. The filtered water may be directed to a place of service by means of the pipe $16^\times$ and pipe C, it being noticed that as the valve 2 is closed the filtered water is prevented from uniting with the unfiltered water entering the pipe 1. For doubly filtering the water the lever 17 is turned to the right or left, (see dotted lines, Fig. 9)—say, to the right—and the cocks 18 and 19 are also turned so as to face in the same direction as the handle of the lever. One of the valves 20 or 21 is closed and the other one is opened. As the blank 24 of the end 22 of the plug B is turned to the right, as shown by the dotted figure at the left of Fig. 5, and the port 25 is thereby closed, the water is caused to flow into the portion 26 of the chamber 4. As the blank 27 of the end 22 of the plug has been turned to the left, as shown by the dotted figure at the left of Fig. 6, the port 28 is closed, the water is caused to flow out of the pipe 7 into the cylinder 9, whereby it is filtered, and escapes through the pipe 11. The valve 20 is closed and the cocks 18 and 19 properly turned, and thus the filtered water enters the valve 18 and one end of the pipe $12^\times$ and passes through the pipe $30^\times$ into the pipe 30, the valve 21 being opened. The water thus enters the cylinder 10, whereby it is additionally filtered, and escapes therefrom through the pipe 14, cock 19, and one end of the pipe $15^\times$, and enters the pipe 15, and so is directed into the chamber 13, it being noticed that the blank 31 of the end 23 of the plug B is turned to the right, as shown by the dotted figure at the left of Fig. 7; hence the water in the portion 33 of the chamber 13 is prevented from entering the portion 34 thereof, owing to the closed ports 32. As the blank 35 of the end 23 of the plug is turned to the left, as shown by the dotted figure at the left of Fig. 8, the port 36 is closed, and thus the water in the portion 33 of the chamber 13 is caused to flow through the port 37 in said end 23, from which point it passes into the pipe 16, so as to be directed to the place of service or discharge.

In order to wash out the filter and freshen the filtering material the valves 21 and 38 are closed, the léver 17 turned to the right, the spigot 29 opened, and the blank of the valve 19 turned to the left. Water now enters the cylinder 9 through the pipe 7, passes down through said cylinder, and is filtered, then passes out through the pipes 11, $12^\times$, 29, $30^\times$, $15^\times$, and 14 into the bottom of the cylinder 10, and up through the latter, thus loosening and agitating the filtering material. The water with its impurities now enters the pipe 8 and reaches the chamber 4, from whence it is directed by the spigot 39 into the basin or bowl 40 and conveying-pipe 41. As the cylinder 10 has been cleansed, the lever 17 is turned to the left. Water now enters the cylinder 10 through the pipe 8 and is discharged in filtered condition through the pipes 14 $15^\times$ $30^\times$ $12^\times$ into the bottom of the cylinder 9, through which it rises, breaking up or loosening and freshening the filtering material. The water with its impurities now escapes through the pipe 7 into the chamber 4, from whence it may be directed into the basin or bowl 40 by opening the spigot 39. Should it be desired to pass water from the main through the pipe 1 into pipe C without passing it through the filter, the valves 6 and 38 are closed and the valve 2 is opened, the water from pipe 1 then directly entering the pipe C. When it is desired to direct unfiltered water into the manipulator, so as to discharge the same through the faucet or spigot of the pipe 16, the valve 2 is closed and the cock 6 so opened as to permit the water to enter the pipe 42 without entering the main portion of the pipe 3. The pipe 42 is connected with the chamber 13 of the manipulator, and as the valve B is properly turned said unfiltered water may be drawn off from said chamber 13 by means of the spigot of the pipe 16.

In order to sustain and steady the manipulator, I employ pipes, rods, or standards 43, which rise from the wall of the chamber 13 and are connected at top by an arch or saddle 44.

Depending from the crown of the saddle is a pipe, rod, or post 45, which is secured to the wall of the chamber 4, thus providing a brace for the manipulator.

Having thus described my invention, what I claim as new, and desire to secure by Letters Patent, is—

1. In a filter, the combination of two distinct filtering-vessels, a manipulator having two chambers, a compound valve having its ports in said chambers, a supply-pipe connected with one of said chambers, and the connected discharge-pipes, substantially as described.

2. In a filter, the combination of two distinct filtering-vessels, the inlet and discharge pipes leading from opposite ends thereof, a manipulator having two chambers with which said pipes are connected, a compound valve in said manipulator, a supply-pipe connected to one of the chambers of the manipulator, and additional pipes, as set forth, connected with the filtering-vessels, and the discharge-pipes thereof, substantially as described.

3. In a filter, the combination of the manipulator B, a supply-pipe therefor, a pipe 3, connecting said supply-pipe to the manipulator, two distinct filtering-vessels, the pipes leading to and from the said manipulator and filtering-vessels, the discharge-pipe $16^{\times\times}$, leading from said manipulator and provided with a spigot, the discharge-pipe $16^\times$, connected with said pipe $16^{\times\times}$, and the bowl 40 below the spigot of said pipe $16^{\times\times}$, substantially as described.

4. In a filter, the two distinct filtering-vessels 9 and 10, the manipulator B, the supply-pipe 1, the pipes 3 and 42, connecting the supply-pipe with the chambers 4 and 13 of the manipulator, and a valve 6, controlling the flow of water from pipe 1 into said chambers 4 and 13, substantially as described.

5. The manipulator and the filtering-vessels, in combination with the discharge-pipes 11 and 14, the pipe $30^{\times}$, connecting said pipes, the pipes $12^{\times}$ and $15^{\times}$, provided with cocks 18 and 19, the pipes 12 and 15, connected with said pipes $12^{\times}$ $15^{\times}$ and with one chamber of the manipulator, the pipes 29 and 30, connected with the pipes $12^{\times}$ and $15^{\times}$ and with the filtering-vessels, and the pipes 7 and 8, connected with the filtering-vessels and the other chamber of the manipulator, substantially as described.

6. In a filter, the combination of the filtering-vessels, the manipulator, the connections between said parts, the standards 43, having an arch 44, and the post 45, substantially as described.

7. A filter having filtering-vessels and supply and discharge pipes connected therewith, in combination with the pipe $30^{\times}$, connected with said discharge-pipes, the pipe $16^{\times\times}$, having a spigot, the bowl 40 below the discharge-spigot of the said pipe $16^{\times\times}$, and the outlet-pipe 41, common to said pipe $30^{\times}$, and the bowl 40, substantially as described.

WILLIAM D. CUMMINGS.

Witnesses:
JOHN A. WIEDERSHEIM,
L. JENNINGS.